(12) United States Patent
Bruun

(10) Patent No.: US 11,356,340 B2
(45) Date of Patent: Jun. 7, 2022

(54) PROVISIONING A SERVICE

(71) Applicant: Hewlett Packard Enterprise Development LP, Houston, TX (US)

(72) Inventor: Peter Michael Bruun, Alleroed (DK)

(73) Assignee: Hewlett Packard Enterprise Development LP, Houston, TX (US)

( * ) Notice: Subject to any disclaimer, the term of this patent is extended or adjusted under 35 U.S.C. 154(b) by 351 days.

(21) Appl. No.: 15/514,611

(22) PCT Filed: Sep. 29, 2014

(86) PCT No.: PCT/EP2014/070838
§ 371 (c)(1),
(2) Date: Mar. 27, 2017

(87) PCT Pub. No.: WO2016/050270
PCT Pub. Date: Apr. 7, 2016

(65) Prior Publication Data
US 2017/0230257 A1     Aug. 10, 2017

(51) Int. Cl.
*H04L 12/24* (2006.01)
*G06F 9/48* (2006.01)
(Continued)

(52) U.S. Cl.
CPC ...... *H04L 41/5054* (2013.01); *G06F 9/44505* (2013.01); *G06F 9/45558* (2013.01);
(Continued)

(58) Field of Classification Search
CPC ..... H04L 41/5054; H04L 41/12; H04L 67/16; H04L 47/70; H04L 47/829;
(Continued)

(56) References Cited

U.S. PATENT DOCUMENTS 7,111,299 B2    9/2006 Tran et al.
7,814,142 B2 *  10/2010 Mamou .................. G06Q 10/10
                                                    709/203
(Continued)

FOREIGN PATENT DOCUMENTS

CN         1942860 A      4/2007
CN       101933000 A     12/2010
(Continued)

OTHER PUBLICATIONS

Oracle, "4 Understanding Orchestration," Oracle (Registered) Communications Order and Service Management Concepts, 2009, pp. 1-55, Release 7.2.2, Retrieved from the Internet on Nov. 24, 2017 at URL: <docs.oracle.com/cd/E35413_01/doc.722/e35415/cpt_orchestration.htm#autoId0>.

(Continued)

*Primary Examiner* — Kevin T Bates
*Assistant Examiner* — Ranjan Pant
(74) *Attorney, Agent, or Firm* — Hewlett Packard Enterprise Patent Department

(57) ABSTRACT

Examples of an apparatus and method for provisioning a service are described. Descriptors are described that represent the service. These are accessed and used to determine a reference required to implement the service. The reference indicates a type of entity and an entity to be passed to a function. The descriptor for the service is instantiated to obtain an instance of the service. This includes obtaining an instance of the type of entity indicated by the reference.

20 Claims, 9 Drawing Sheets

(51) Int. Cl.
*G06F 9/445* (2018.01)
*G06F 9/455* (2018.01)
*H04L 29/08* (2006.01)
*H04L 41/5054* (2022.01)
*H04L 67/51* (2022.01)
*H04L 41/5041* (2022.01)

(52) U.S. Cl.
CPC .......... *G06F 9/485* (2013.01); *H04L 41/5048* (2013.01); *H04L 67/16* (2013.01); *G06F 2009/45562* (2013.01)

(58) Field of Classification Search
CPC ............. H04L 41/0893; H04L 41/5041; H04L 41/5048; G06F 11/3442; G06F 2201/815; G06F 9/5077; G06F 2009/45562; G06F 9/50; G06F 9/44505; G06F 2009/4556; G06F 9/485; G06F 9/45558
See application file for complete search history.

(56) References Cited

U.S. PATENT DOCUMENTS

| | | | |
|---|---|---|---|
| 7,950,007 B2 | 5/2011 | Mohindra et al. | |
| 8,191,043 B2 | 5/2012 | Mohindra et al. | |
| 8,245,122 B2 | 8/2012 | Liu et al. | |
| 8,301,755 B2 | 10/2012 | De et al. | |
| 8,418,002 B2 | 4/2013 | Lazzaro | |
| 8,863,137 B2 | 10/2014 | Keller et al. | |
| 8,880,591 B2 | 11/2014 | Feldman et al. | |
| 8,914,499 B2 | 12/2014 | Houlihan et al. | |
| 8,954,418 B2 | 2/2015 | Faerber et al. | |
| 9,286,106 B1 | 3/2016 | Huang | |
| 9,367,374 B2 | 6/2016 | Kaus et al. | |
| 9,378,120 B2 | 6/2016 | Chakraborty et al. | |
| 9,430,262 B1* | 8/2016 | Felstaine | G06F 9/45558 |
| 9,594,601 B2 | 3/2017 | Shau et al. | |
| 9,998,562 B1* | 6/2018 | Peterson | G06F 8/72 |
| 10,178,027 B2* | 1/2019 | Johnsen | H04L 45/02 |
| 10,275,258 B2 | 4/2019 | Zellermayer et al. | |
| 10,326,845 B1 | 6/2019 | Jaeger | |
| 10,348,857 B2* | 7/2019 | Filippis | H04L 67/34 |
| 10,419,524 B2 | 9/2019 | Schincariol et al. | |
| 10,454,771 B2* | 10/2019 | Ellis | H04L 49/70 |
| 10,594,621 B2* | 3/2020 | Sharma | H04L 45/30 |
| 10,785,128 B1* | 9/2020 | Bawcom | G06Q 10/0633 |
| 11,080,491 B2* | 8/2021 | Mihindukulasooriya | G06F 40/268 |
| 2004/0260602 A1* | 12/2004 | Nakaminami | G06Q 10/10 705/7.29 |
| 2005/0086562 A1 | 4/2005 | Demsky et al. | |
| 2005/0155042 A1* | 7/2005 | Kolb | G06F 9/44505 719/318 |
| 2005/0240354 A1* | 10/2005 | Mamou | G06Q 10/10 702/19 |
| 2006/0029054 A1 | 2/2006 | Breh et al. | |
| 2006/0256733 A1* | 11/2006 | Bejerano | H04L 12/462 370/254 |
| 2006/0268742 A1 | 11/2006 | Chu et al. | |
| 2007/0043803 A1 | 2/2007 | Whitehouse et al. | |
| 2007/0294668 A1* | 12/2007 | Mohindra | G06F 8/36 717/120 |
| 2008/0294777 A1 | 11/2008 | Karve et al. | |
| 2009/0157723 A1 | 6/2009 | De et al. | |
| 2009/0193439 A1* | 7/2009 | Bernebeu-Auban | G06F 8/61 719/320 |
| 2009/0327216 A1 | 12/2009 | Brown et al. | |
| 2010/0057780 A1* | 3/2010 | Isobe | G06F 8/71 707/E17.045 |
| 2010/0333109 A1 | 12/2010 | Milnor | |
| 2011/0046992 A1* | 2/2011 | Erhard | G06Q 10/0637 705/7.11 |
| 2011/0145657 A1* | 6/2011 | Bishop | G06F 11/3495 714/47.1 |
| 2011/0276444 A1 | 11/2011 | Tornkvist | |
| 2012/0016713 A1 | 1/2012 | Wilcock et al. | |
| 2012/0089726 A1* | 4/2012 | Doddavula | G06F 9/5072 709/224 |
| 2012/0117226 A1* | 5/2012 | Tanaka | H04L 41/0266 709/224 |
| 2013/0036425 A1 | 2/2013 | Zimmermann | |
| 2013/0127891 A1 | 5/2013 | Kim et al. | |
| 2013/0151317 A1 | 6/2013 | Charfi et al. | |
| 2013/0152090 A1* | 6/2013 | Balko | G06F 9/52 718/102 |
| 2013/0198760 A1 | 8/2013 | Cuadra et al. | |
| 2013/0217361 A1 | 8/2013 | Mohammed et al. | |
| 2013/0290937 A1 | 10/2013 | Joukov et al. | |
| 2014/0013315 A1 | 1/2014 | Genevski et al. | |
| 2014/0074905 A1 | 3/2014 | Schincariol et al. | |
| 2014/0075048 A1* | 3/2014 | Yuksel | H04L 45/02 709/242 |
| 2014/0098673 A1* | 4/2014 | Lee | H04L 45/64 370/238 |
| 2014/0172944 A1* | 6/2014 | Newton | H04L 41/0823 709/202 |
| 2014/0229945 A1* | 8/2014 | Barkai | H04L 49/70 718/1 |
| 2014/0236843 A1* | 8/2014 | Bain | G06Q 30/01 705/301 |
| 2014/0250489 A1* | 9/2014 | Calo | H04L 63/20 726/1 |
| 2014/0278662 A1* | 9/2014 | Reed | G06Q 10/0631 705/7.17 |
| 2015/0006733 A1 | 1/2015 | Khan et al. | |
| 2015/0120380 A1* | 4/2015 | Deshpande | G06Q 30/0201 705/7.29 |
| 2015/0124645 A1 | 5/2015 | Yadav et al. | |
| 2015/0278395 A1* | 10/2015 | Ben Jemaa | G06F 8/10 707/756 |
| 2015/0309780 A1 | 10/2015 | Ruehl et al. | |
| 2015/0365322 A1* | 12/2015 | Shatzkamer | H04L 45/74 370/392 |
| 2015/0378774 A1* | 12/2015 | Vermeulen | G06F 9/466 707/703 |
| 2016/0080422 A1* | 3/2016 | Belgodere | H04L 63/20 706/47 |
| 2016/0094477 A1 | 3/2016 | Bai et al. | |
| 2016/0323082 A1* | 11/2016 | Watanabe | H04W 28/08 |
| 2016/0378450 A1 | 12/2016 | Fu et al. | |
| 2017/0161104 A1 | 6/2017 | Johnson et al. | |
| 2017/0161129 A1 | 6/2017 | Johnson et al. | |
| 2017/0207968 A1* | 7/2017 | Eicken | H04L 41/0843 |
| 2017/0257432 A1 | 9/2017 | Fu et al. | |
| 2017/0270214 A1 | 9/2017 | Narasimhan et al. | |
| 2017/0289060 A1 | 10/2017 | Aftab et al. | |
| 2017/0322954 A1 | 11/2017 | Horowitz et al. | |
| 2017/0366623 A1* | 12/2017 | Shi | H04L 67/16 |
| 2018/0083828 A1 | 3/2018 | Cartaya et al. | |
| 2018/0107186 A1 | 4/2018 | Brown et al. | |
| 2018/0145884 A1 | 5/2018 | Stefanov et al. | |
| 2018/0157472 A1 | 6/2018 | Chen | |
| 2018/0165071 A1 | 6/2018 | Raghavan et al. | |
| 2018/0234308 A1* | 8/2018 | Bruun | H04L 41/0893 |
| 2018/0246755 A1* | 8/2018 | Ailamaki | G06F 9/4843 |
| 2018/0359162 A1 | 12/2018 | Savov et al. | |
| 2019/0058638 A1 | 2/2019 | Ahuja et al. | |
| 2019/0068440 A1 | 2/2019 | Laird | |
| 2019/0155926 A1* | 5/2019 | Scheideler | G06F 16/215 |
| 2020/0186446 A1* | 6/2020 | Yousaf | H04L 41/5054 |

FOREIGN PATENT DOCUMENTS

| | | |
|---|---|---|
| CN | 102138315 A | 7/2011 |
| CN | 103516781 A | 1/2014 |
| CN | 104901998 A | 9/2015 |
| CN | 105164660 A | 12/2015 |
| WO | WO-2007146368 A2 | 12/2007 |
| WO | 2008/091663 A1 | 7/2008 |

(56) References Cited

FOREIGN PATENT DOCUMENTS

| WO | 2011/162744 A1 | 12/2011 |
|---|---|---|
| WO | 2015/032435 A1 | 3/2015 |
| WO | 2017/129248 A1 | 8/2017 |

OTHER PUBLICATIONS

Office Action received for European Patent Application No. 14790011.2, dated Apr. 10, 2018, 5 pages.
Office Action received for European Patent Application No. 14790011.2, dated Aug. 3, 2018, 4 pages.
Kelly et al., "Output-Valid Rollback-Recovery", HP Labs, HPL-2010-155, 2010, pp. 1-14.
International Search Report and Written Opinion received for PCT Patent Application No. PCT/EP2016/051851, dated on Oct. 10, 2016, 10 pages.
International Preliminary Report on Patentability received for PCT Application No. PCT/EP2014/070838, dated Apr. 13, 2017, 10 pages.
International Preliminary Report on Patentability received for PCT Patent Application No. PCT/EP2016/051851, dated Aug. 9, 2018, 8 pages.
Ferry et al., "A Real-time Scheduling Service for Parallel Tasks", IEEE 19th Real-Time and Embedded Technology and Applications Symposium (RTAS), Apr. 2013, 11 pages.
Fdhila Walid et al., "On Evolving Partitioned Web Service Orchestrations," IEEE International Conference on Service-Oriented Computing and Applications, Dec. 2012, pp. 1-7.
Cerrato, et al., "User-Specific Network Service Functions In An SDN-Enabled Network Node", Deptment of Computerand Control Engineering. Politecnico di Torino. Torino, Italy. 2014, 2 pages.
Clayman, et al., "The Dynamic Placement Of Virtual Network Functions", Telecom Italia Strategy Future Centre. Via Reiss Romoli 274, 10148 Turin, Italy. IEEE 2014, 9 pages.
Intel, "End-To-End NFV vEPC Service Orchestration Of A Virtual EPC Network Function Virtualization Use Case On Intel Architecture", Intel Network Builders Reference Architecture Retreived on Mar. 26, 2017 24 pages.
International Searching Authority, "Notifcation Of Transmittal Of The International Seach Report And The Written Opinion", PCT/EP2014/070838, dated Jun. 15, 2015 12 pages.
Xiao et al., "Process Dependencies and Process Interference Rules for Analyzing the Impact of Failure in a Service Composition Environment", Proceedings of the 10th international conference on Business information systems, 2007, pp. 67-81.
Laurent et al., "Planning for Declarative Processes", The 29th Annual ACM Symposium on Applied Computing, 2014, pp. 1126-1133.
Bohm et al., "Processes Are Data: a Programming Model for Distributed Applications", Web Information Systems Engineering—WISE 2009, 12 Pages.
Yang et al., "Research on Software Architecture-based Composition of Internetware", May 15, 2007, 3 pages.
Casati et al., "eFlow: A Platform for Developing and Managing Composite E-Services", Proceedings Academia/Industry Working Conference on Research Challenges, 2000, pp. 341-348.

\* cited by examiner

PROVISIONING A SERVICE

Cross Reference To Related Applications

This application claims the benefit of PCT/EP2014/070838, filed Sep. 29, 2014, which is herein incorporated by reference in its entirety for all purposes.

BACKGROUND

Defining the processes to provision a complex service, such as a network and/or communications service, can typically be a very complicated task, particularly when considering the processes to perform all possible modifications of such services. For example, activating a physical network function may take months or years; similarly, migrating a service from one platform to another may take years and in certain cases may never be satisfactorily completed. In these cases, a speed of the provisioning process is typically dependent on the speed physical network devices can be procured and installed, which may be days, weeks, or months.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
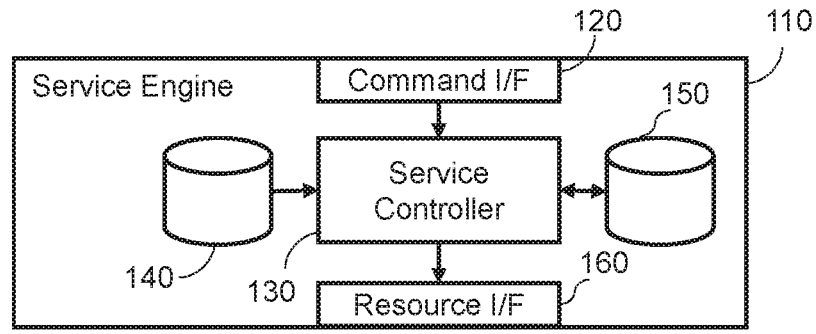
FIG. 1 is a schematic diagram showing a service engine for provisioning a service according to an example.

Service providers, such as the telecommunications industry, have struggled to develop a simple and maintainable process to automate the creation and maintenance of complex services, such as communications or network services. Due to the time required to provision physical devices, effort has not been expended in accelerating the time required to configure these devices to provide an operational service; there is no need to configure the system in days if it takes months to procure and install the physical devices. The advent of network function virtualization has turned this on its head. With network function virtualization, a virtual network function may be implemented in minutes, for example by simply loading an appropriate disk image as a virtual machine.

In a comparative cases, there are two approaches for provisioning a service using network function virtualization. In a first case, whenever a provisioning request relates to the modification of a service all constituent virtual network functions may be torn down and recreated with the modification in place. In a second case, explicit processes are defined to create and delete the service and the connections between the network functions implementing the service, e.g. in a hard-coded manner. This is typically performed for every possible combination of virtual network functions.

In the first comparative case, recreating the service with the modification has a benefit of simplicity but it leads to a risk of substantial service disruption during the recreation process. This is not acceptable for services with a predefined availability requirement, such as being available 99.999% of the time. It may also lead to irrecoverable data loss for stateful service configurations and this approach would typically involve the needless destruction and recreation of virtual network functions or virtual network components that are then recreated with no modification, e.g. the modification may require only require changing a parameter on a single virtual network device.

In the second comparative case, explicitly defining the transitions between service states to implement a modification may address some of these disadvantages; however this is at the cost of high complexity and many man-hours of development and testing. For example, if the number of sub-services associated with a particular service is n, then the number of transitions between different configurations of these sub-services, i.e. different service states, is $n^2$. Hence, even simply cases with a handful of sub-services are impractical to implement. Furthermore, every additional hard-coded transition increases the risk of coding error and substantial service disruption.

Certain examples described herein provide a method for the declarative provisioning of complex services. Certain examples described herein enable a service to be provisioned through the use of "descriptors", in particular a "service descriptor" for the service and descriptors for any entities associated with the service. These entities may be, amongst others: sub-services; physical, logical and/or virtual network functions; physical, logical and/or virtual network components; place-keeper entities; infrastructure resources such as physical computing, storage and networking resources; and networks. Descriptors are data structures that declaratively define the properties of the service and/or entity. In this description the term "provisioning" is used broadly to cover at least the creation, modification and deletion of a service, e.g. as a synonym for service fulfillment in a telecommunications context. For example, a service may be provisioned in response to a request to create, modify or delete a particular service. This may also involve requests to add, modify or delete one or more sub-services. Certain examples of an apparatus are described that receives a command to provision a service and translates the command into a sequence of actions on underlying physical, logical and virtual infrastructure. This translation is achieved by way of the service descriptors. These data structures represent the service by way of a set of parameters. The values of these parameters are assigned to generate a particular instance of the service that may be implemented on said infrastructure. To manage transitions a service descriptor data structure may reference entities such as other sub-services, for example particular virtual network functions or combinations of virtual network functions, each of these again being represented by a service descriptor.

In certain examples herein, a descriptor defines which child entities an instance of that descriptor may have. The descriptor can furthermore define how parameter values are passed from a parent entity to its child entities. This process is called decomposition. This allows parent and child entities to be quickly deployed. An instance may also, when prescribed by the descriptor, reference instances other than the parent. In these cases, the descriptor may also define parameter values to be passed between the referrer and the referenced instance. Descriptors thus provide data objects that enable meaningful system configurations and topologies to be represented, independently of concrete infrastructure configurations.

For example, parent and child entities may be defined using a tree structure to model the parent-child relationship. Use of references as described herein expand this relationship to enable entities to form relationships that may be modelled as a directed, acyclic graph.

FIG. 1 is a simplified schematic diagram of an apparatus 100 for provisioning a service according to an example. The apparatus 100 comprises a service engine 110. The service engine 110 is arranged to receive a command to provision a service, access one or more service descriptors associated with the service and to obtain instances of these descriptors to activate the service. In this case an "instance" comprises an implementation of a descriptor where parameters specified in the descriptor are assigned values, e.g. a meaning consistent with its use in object-oriented programming. Similarly the term "instantiating" as used herein refers to generating an instance, consistent with its use in computer science. One or more instances may be instantiated from a single descriptor. In certain cases this may involve a state transition process that involves reserving, provisioning and activating one or more virtual network functions that make up the service. The service engine 110 is further arranged to instruct the assignment of physical computer resources, e.g. server computer devices, to implement the virtual network functions, e.g. in the form of virtual machines running on said server computer devices.

The service engine 110 of FIG. 1 comprises a command interface (I/F) 120, a service controller 130, a service descriptor data store 140, an instance data store 150 and a resource interface (I/F) 160. The request interface 120 is arranged to receive a command to provision a service. This may be a request, e.g. based on a communications protocol, to create, modify or delete a service. Alternatively it may be a command from a graphical user interface and/or a programmatic interface. The service controller 130 is communicatively coupled to the command interface 120. The service controller 130 is arranged to parse a command received at the command interface 120 and to obtain instances to provision the service. To do this, the service controller 130 is arranged to access the service descriptor data store 140 to obtain one or more descriptors. These descriptors may be service descriptors for the service and descriptors for any entities required to implement the service. These entities may be sub-services, which may be selected using the command interface 120, and any internal entities that are not selectable using the command interface 120. The service descriptor data store 140 may be locally or remotely coupled to the service controller 130. The service controller 130 is arranged to determine any entities that are associated with the service descriptor for the requested service, a process that may be referred to as "decomposition". Decomposition also involves determining any references contained in the service descriptor. The service controller 130 is arranged to resolve these references when instantiating the service.

Having obtained a set of appropriate descriptors, e.g. for the service and any associated entities, the service controller 130 is then arranged to instantiate the obtained descriptors. If successful, instances are generated as defined by the obtained descriptors. These generated instances comprise data structures, e.g. in the form of data object instances in an object-based implementation, that encapsulate a particular state of the entity defined in the descriptor. This state is based on assigning parameter values to parameters defined in the descriptors. As part of the generation of one or more instances the service controller 130 may instruct the assignment of physical computing resources via the resource interface 160. For example, the service controller 130 may request processor and memory resources on a server computing device that may be used to implement a virtual machine on the server computing device, the virtual machine implementing one or more virtual network functions that are required to provide the service.

The command interface 120 may be an application programming interface that is arranged to receive requests from a network. For example, the request interface may be a Java® remote method invocation interface and/or a representational state transfer (REST) interface arranged to receive network requests, e.g. from dedicated networks or the Internet.

In certain cases a state transition process may be used to define a number of actions that are required to provision the service. An example state transition process is described later with reference to FIG. 4. The state transition process may operate on data objects such as service descriptors and service instances. Applying actions to these data objects may change the state of the object, e.g. may instantiate or partially instantiate an instance from a descriptor. In one case an action may comprise a method or function call on the data object. Parameter values that are received together with the command and/or that are determined from one or more existing instances may also be passed to perform the action. The service controller 130 may access a parameter value that indicates a computing system that controls the data object.

The service engine 110 and its subcomponents 120 to 160 may be implemented by one or more server computer devices. For example, data stores 140, 150 may be implemented using one or more locally or remotely coupled storage devices; interfaces 120, 160 may comprise a combination of physical hardware interfaces, e.g. network interfaces, and control software arranged to process communications transmitted using a particular physical layer technology. The service controller 130 may comprise dedicated hardware, e.g. circuitry, or a combination of software and hardware, such as computer program code or computer-readable instructions stored in a non-transitory computer-readable storage medium that is available to be processed by one or more central processing units of the server computer devices. The service engine 110 and its subcomponents 120 to 160 may be embodied in a single server computer device or may form a distributed system over a plurality of server computer devices.

Figure 2:
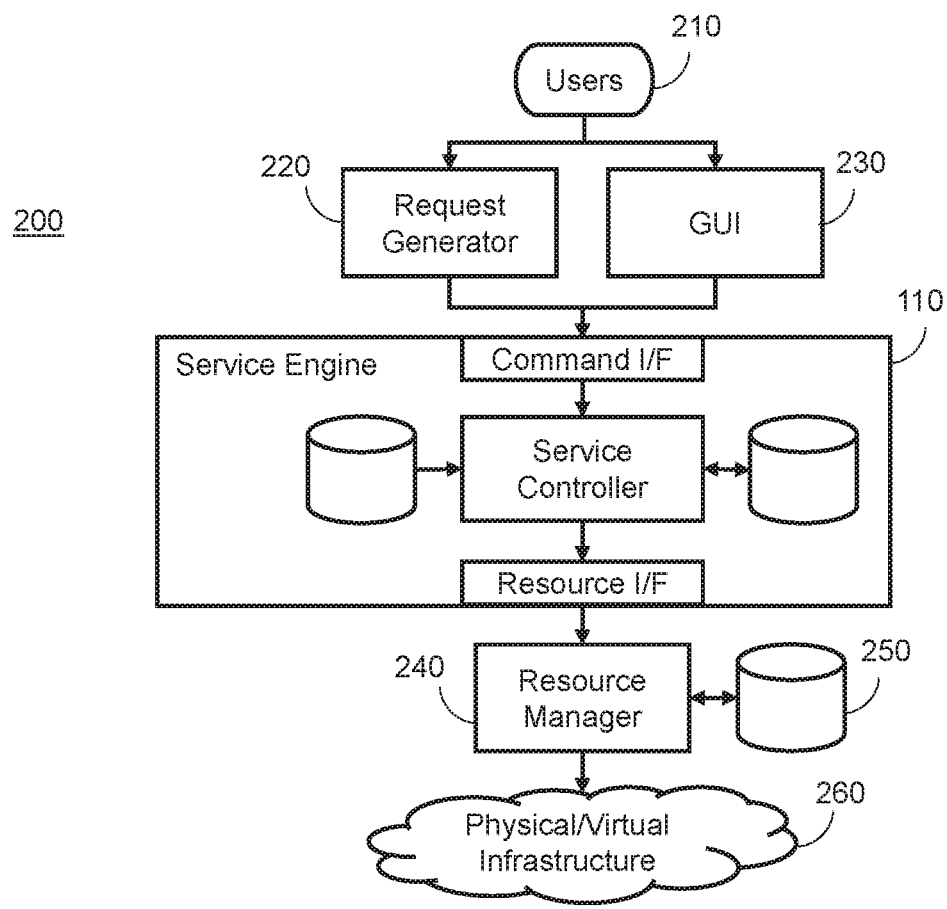
FIG. 2 is a schematic diagram showing a number of components that operate with the service engine of FIG. 1 according to an example.

FIG. 2 shows an example 200 of a number of additional components that may interact with the apparatus 100 of FIG. 1. In particular, FIG. 2 shows a number of additional components that may interface with the service engine 110 via the request interface 120 and the resource interface 160. Reference numerals for components of the service engine 110 have been omitted in FIG. 2 for clarity.

FIG. 2 shows a set of users 210. These may be service users, i.e. users tasked with requesting a service. The users 210 of FIG. 2 may send a request via one or more of request generator 220 and graphical user interface 230. The request generator 220 and the graphical user interface 230 are both communicatively coupled to the command interface 120. The command interface 120 may thus receive network communications from these components. The request generator 220 may comprise any system that is able to generate requests, whether directly or indirectly. For example it may comprise an element or resource management system that is used to manage network elements of a telecommunications system. The request generator 220 may be accessed by users 210 via, or may comprise in itself, an operations support system, i.e. a system typically used by telecommunications providers to manage telecommunications networks. There may be more than one request generator 220, e.g. many systems may supply requests to the command interface 120. The graphical user interface 230 provides a graphical front end for users 210 to place a command, e.g. by completing a form comprising one or more user interface elements associated with different parameters defined in a service descriptor. The request generator 220 and the graphical user interface 230 allow users 210 to directly and/or indirectly generate commands to request the provision of services. In certain cases, commands and/or requests may originate without an input from users 210, e.g. they may originate from an operations support system in response to an automated monitoring activity.

One or more of the request generator 220 and the graphical user interface 230 may also enable the user to select a particular service and/or sub-service to create, modify or delete, e.g. from a list of available services and/or sub-services. For example, a user 210 may be shown one or more active services and/or one or more services that are available for activation. A similar choice may be presented for sub-services. One or more active services and/or sub-services may be associated with instances present in instance data store 150. One or more services that are available for activation may be associated with service descriptor data structures present in the service descriptor data store 150.

FIG. 2 also shows a resource manager 240 that is communicatively coupled to the resource interface 160. The resource manager 240 is also communicatively coupled to a resource data store 250. Resource data store 150 comprises records of a set of physical, logical and/or virtual resources that are available to implement a service and its associated entities. For example, the resource data store 250 may comprise a record of the components that make up a physical and/or virtual infrastructure 260. While logical and virtual resources are discussed it is to be understood that these will ultimately, e.g. at a low level of implementation detail, be implemented using physical computing, storage or network, i.e. hardware, resources. For example, a network function virtualization infrastructure may comprise virtual computing (e.g. processor), virtual storage (e.g. hard disk) and virtual network (e.g. virtual network interface controllers) resources implemented on a virtualization layer (e.g. implemented by one or more hypervisors or virtual machine monitors). The virtualization layer then operates on hardware resources such as processor devices, storage devices and physical network devices, for example as provided by one or more server computer devices.

The resource manager 240, together with the resources defined in the resource data store 250, provide entity-action building blocks based on a physical and/or virtual infrastructure 260 that may be combined in the form of a descriptor to enable the provision of a service. The service engine 110 may be seen to determine what to orchestrate when providing network function virtualization, whereas the resource manager 240 determines how to orchestrate what has been selected by the service engine 110.

In one case, the service controller 130 may also have access to the resource data store 250. The service controller 130 may use this access to select descriptors during the instantiation of a parent-child instantiation path.

Figure 3A:
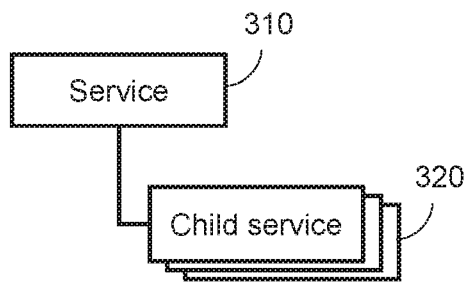
FIG. 3A is a schematic diagram showing features of a service descriptor according to an example.

FIG. 3A is a schematic illustration of an example 300 of service 310. Service 310 is defined by a service descriptor data structure. For example, the service 310 may be comprise a number of network functions to implement a communications network at a particular location, such as firewall, access control, device connection and routing functions. The service 310 may have a first number of parameters. These may be defined in the service descriptor for the service. Values for these parameters, e.g. the selection of one set of available options for the service, may be bound during instantiation by the service controller 130. A service instance may be generated based on a service descriptor for the service 310 following a command to provision the service. For example, actions of "create", "modify" and "delete" may be defined in relation to the service 310. These actions may be implemented using the service descriptor for the service 310, e.g. a service descriptor may define parameters and a decomposition of the service and be instantiated to generate an instance of the service for activation.

The service 310 has a number of child services 320. In FIG. 2 these are shown as having a parent-child relationship, i.e. the service 310 is the parent of child services 320. Both parent and child services may be defined by their own service descriptors, and may in turn be parents in a parent-child relationships to further levels of child services. They may comprise elements of the service 310 that can be managed by a user 210 via a command received at the command interface 120. All three types may comprise entities that are bound to atomic resources managed by the resource manager 240, e.g. resources defined by records in the resource data store 250 that represent atomic entities of the physical and/or virtual infrastructure 260. For example, child services 320 may comprise resources in the form of networks and virtual machines; these may be activated before the parent service 310 is activated. They may not be accessible to a user. Similarly, child services 320 may comprise components that are also not accessible to a user, e.g. that are managed internally by the service engine 110 to provision a service; these components may be instantiated as part of instantiating the service descriptor of the parent service 310.

A service 310 may specify the child services 320 in the service descriptor for the service. The service descriptor defines how particular entities may be associated with the service, e.g. how particular virtual network functions may be combined to provide the service. In certain cases there may be a loose coupling between the parent service descriptor and the child service descriptor. For example, a child service 320 may be represented in the parent service descriptor as sub-service of a particular type, e.g. as a category of virtual network functions such as virtual router, virtual security gateway or virtual accelerator. Entities of a particular type may have a particular "type" descriptor that defines a number of parameters that are common to all implementations of the entity. For example, a service descriptor may define possible sub-services via declarations of descriptors having the types associated with those sub-services, e.g. a virtual router type, a virtual security gateway type and a virtual accelerator type. A particular sub-service implementation, e.g. a particular sub-service descriptor, may then be associated with the sub-service type declaration during provisioning of the service, e.g. in response to a particular implementation being selected in data from a received request or based on an existing and available instance of the service or sub-service. For example, a plurality of descriptors of a particular type may be chosen from when instantiating a sub-service 320 described by a particular one of those descriptors.

The service descriptor for the parent service 310 defines a set of policies for computing and passing parameters to child services 320. In one case, an instance of a child entity may be passed as a parameter to a fellow or sibling child entity, e.g. an instance of a child service may be passed to instantiate child service. The service descriptor for the service 310 may define policies that specify the conditions under which the child services 320 are to be activated, e.g. instantiated and what number of instances to instantiate of each. A modification request is called "scale-out" if it directly or indirectly causes an increase the number of instances of a type of child service, and a modification is called "scale-in" if it causes a decrease in the number of child services.

Figure 3B:
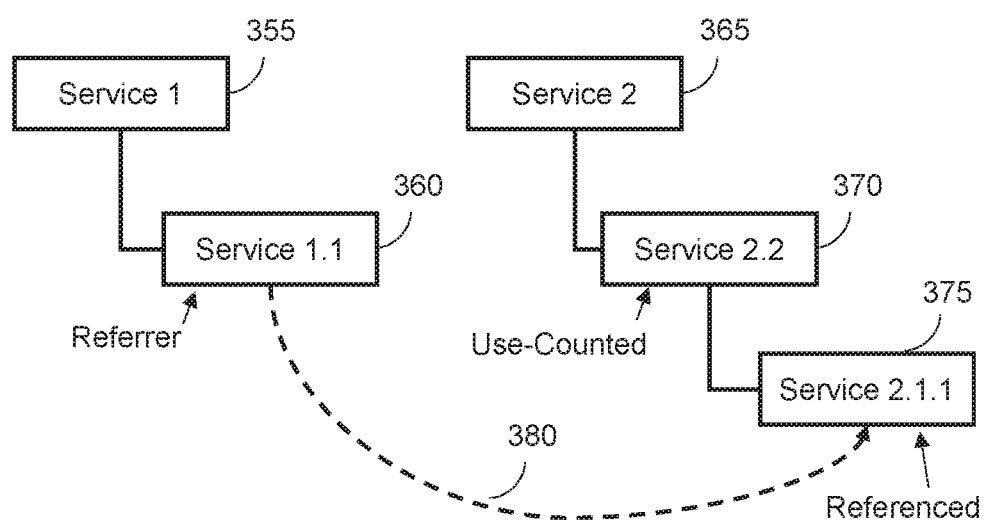
FIG. 3B is a schematic diagram showing a relationship between service descriptors according to an example.

In the example of FIG. 3A, a service 310 has one or more child entities. FIG. 3B shows an example 350 of a service referencing other entities. In FIG. 3B a first service—service 1—355 and a second service—service 2—365 are shown. Each of these services may be implemented as specified by a service descriptor. The first service 355 has one child entity: service 1.1—360. This is a referrer entity that makes reference 380 to a referenced entity: service 2.2.1—375 of the second service 365. The reference 380 may be of the form, e.g. in a descriptor:

```
reference:
    type: [entity type]
    constant: [$entity].
```

In this case the "type" defines the entity type ("[entity type]") to be used as a value for the reference 380, which may be a reference to a name of a descriptor or a class of descriptors for the type of entity that the reference parameter may hold as a value, and "constant" defines an entity to be passed to a function to obtain an entity of the defined type ("[$entity]").

For example, a "Link" type descriptor, representing a network link connecting a network interface to a network port, may have a reference 380 in the form:

```
reference:
    type: NetPort
    constant: $network.
```

In this case the reference 380 is to have a value that is an instance of an entity of the type "Network Port" and an instance of the type "network" is to be passed to a function to obtain this "Network Port" instance. In effect, the service controller 130 is arranged to implement a function that starts with a "network" entity, and automatically generates a parent-child hierarchy, e.g. generates any required intermediate instances, such that a "Network Port" instance may be used as a value for a "Link" instance.

Similarly, a virtual server entity may have a declaration in the form:

```
component: vserver:
    component: RunningVM
        reference:
            type: VMImage
            constant: $cpebox
    component: cpebox:
        component: VMImage:
            URLParameter: www.example.com/123
```

In this case the reference is to an entity of the type "VMImage", i.e. a virtual machine image, and an instance of the type "cpebox", e.g. an instance representing the onsite server is to be used to obtain this entity, the "VMImage" instance of the "cpebox" instance having a parameter that defines the uniform resource locator (URL) for the correct version of a virtual machine image stored on the server.

As shown above, the reference may be defined by data in the descriptor data structure representing the referrer entity 360. In FIG. 3B a "Use-Counted" child service (2.1) 370 is shown. For example, the referenced entity—child service 2.2.1—375 may require one parent entity 370 that may or may not already exist at the time of instantiating the referrer. Instances for these parent entities will only be generated when they are required. As such the "Use-Counted" entity 370 only exists if one or more of its children entities exist. Hence, an instance corresponding to the "Use-Counted" entity 370 may be generated when the reference is resolved, i.e. requiring an instance of the referenced entity 375, and no instances associated with the referenced entity 375 exist. Similarly, if the reference to referenced entity 375 is removed and no other entities reference this entity, then instances of the referenced entity 375 may be deleted along with instances of the "Use-Counted" entity 370. This enables efficient management of entity instances in instance data store 150. For example, entities such as 370 may correspond to real, resource-consuming configurations of the actual physical and/or virtual infrastructure 260. So deleting an instance of child service 370 may cause the system, through state-transitions that call the resource manager 240, to automatically free up valuable and/or limited infrastructure resources; e.g. virtual Switch configurations on a hypervisor may be potentially very large image files stored on the physical disk of the physical server, consuming scarce and costly physical disk capacity.

Being the parent, the descriptor for the second service 365 controls, through parameter bindings, the configuration of its referenced child entity 370, and the descriptor for 370 will similarly control the configuration of 375. Hence, the referrer descriptor only needs to be concerned with the configuration of the referring side of the connection, whereas the descriptors on the referenced side only need to be concerned with describing how the services on that side of the reference should be configured.

References such as those shown in FIG. 3B may be used in a number of ways. For example, as demonstrated, network configurations may be referenced as data objects from network link data objects to create virtual switches on a given infrastructure. Additionally, virtual network function components may reference virtual machine images, such that when the virtual network function component is instantiated the appropriate image files are downloaded and installed as a virtual machine.

Figure 4:
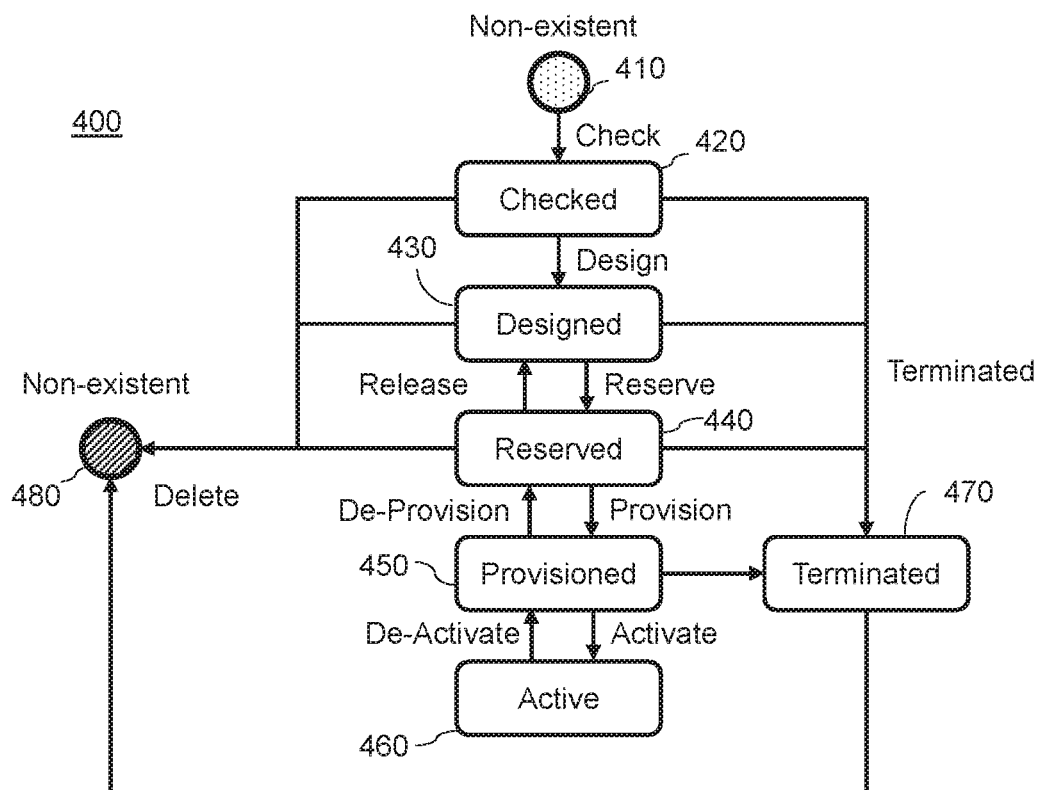
FIG. 4 is a state transition diagram showing a process for provisioning a service according to an example.

FIG. 4 is a schematic illustration showing a state transition process 400 according to an example. The diagram in FIG. 4 is based on the TeleManagement Forum (TMF) Multi-Technology Operations System Interface (MTOSI) standard: TMF518_SA_2. The state transition process may be used to generate a service instance based on a service descriptor data structure. It should be noted that other state transition processes may be used. For example, a simple case may have two states with no explicit transition: a state that a service is not instantiated, e.g. that only descriptors exist, and a state that the service is instantiated, e.g. that one or more instances have been obtained and/or generated based on the required descriptors. In other cases, the state transition process may be configurable, and states and transitions may be added, removed and/or modified as required for any one particular implementation. FIG. 4 is therefore shown as an example to better explain how a service may be provisioned using the described examples.

State 410 is indicative of a non-existent state. This means that the service instance has not been created yet. To move from non-existent state 410 to a "checked" state 420 the service instance is created in the service data store, and a service descriptor and requested parameters values are recorded there and subjected to simple validity checks, but the parameters from the request are not yet processed according to the service descriptor. This may comprise a "check" action. This may comprise generating a service instance and storing this in instance data store 150. During the check action parameter values may be assigned by evaluating parameter values indicated in a received request and/or by evaluating any bound parameter values. From the checked state 420 a "design" action may be applied to the service instance to move to a "designed" state 430. During the design action, parameter values may be evaluated as defined in the service descriptor.

From a designed state 430 a service instance may be the subject of a "reserve" action. The reserve action may comprise communication via the resource interface 160 to reserve resources and to values of reserved resources to the service instance. For example, on receipt of a request to reserve particular resources to fulfill the required parameter values, resource manager 240 may select an appropriate resource from resource data store 250 and return values for the selected resource to the service controller 230 via the resource interface 160. This action may also and/or alternatively comprise an operation on a one of the data stores to mark resources as reserved. If a reserve action is successful the resource values are stored as part of the service instance and the service instance moves to a "reserved" state 440. Resources reserved by service instances in the reserved state may be released by a "release" action that transitions a service instance back to the designed state 430. From a reserved state 440, a "provision" action may be applied to transition a service instance to a "provisioned" state 450. In a provisioned state 450 a service represented by a service instance has been created in an inactive state on the physical/virtual infrastructure 260. For example, parameter values have been assigned to the parameters of the service descriptor and any child and/or referenced descriptors, and physical, logical and/or virtual devices have been allotted via the resource manager 240. In one case resource manager 240 may receive at least a reference to one or more instantiate entities and use the parameter values defined therein to select appropriate physical, logical and/or virtual resources. From the provisioned state 450 the service instance may transition back to the reserved state 440 via a "de-provision" action or may be activated via an "activate" action to move to an "activated" state 460. In the activated state 460 the service is live. From an activated state 460 a service instance may transition back to the provisioned state 450 via a "de-activate" action.

As shown in FIG. 4 a service instance in a checked 420, designed 430 or reserved 440 state may be deleted via a "delete" action to transition to another non-existent state 480. Similarly, a service instance may be terminated via a "terminate" action from any one of the checked 420, designed 430, reserved 440 or provisioned states to transition to a "terminated" state 470. From the terminated state 470 the service instance may also be deleted via a delete action to transition to the non-existent state 480. In a non-existent state 410, 480 a service instance does not exist in the instance data store 150. Although certain actions are associated with certain transitions, as described above, these may have different forms, or be associated with different transitions in other examples.

Instances may have parameter values that record a current state and a desired state, e.g. as requested. Each of the state transitions may also involve implementing a state transition process for one or more associated entities, e.g. one or more sub-services and the like. This may involve generating and/or modifying an instance generated for a sub-service based on a descriptor for the child entity.

Figure 5A:
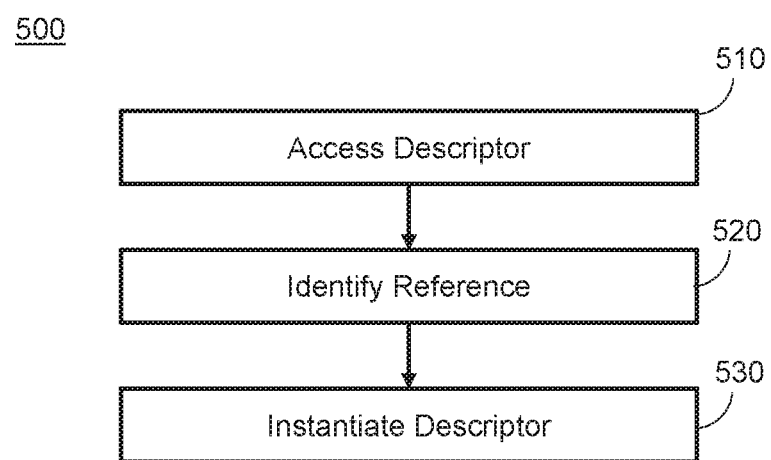
FIG. 5A is a flow diagram showing a method for provisioning a service according to an example.

FIG. 5A shows a method 500 for provisioning a service. This method may be applied, for example, by the apparatus 100 of FIG. 1.

At block 510 a descriptor for a service is accessed. This may be performed in response to receiving a provisioning request. This may comprise receiving a request to create, modify or delete a service. The service may comprise a set of one or more virtual network functions. At block 520 a reference, such as shown in FIG. 3B, required to implement the service is identified using the descriptor. The reference may be within the descriptor for the service or within a descriptor for a child entity defined in the descriptor for the service. A descriptor may be selected that matches the service indicated in a received request. The reference indicates a type of entity and an entity to be passed as a parameter. Block 520 may also involve a decomposition process, wherein a number of entities defined in the descriptor for the service are identified. If any of these entities have an associated descriptor, these may also be accessed at block 520. At block 530 at least the descriptor for the service is instantiated to obtain an instance of the service. This comprises obtaining an instance of the type of entity indicated by the reference, and passing an instance of the entity indicated by the reference as a parameter to the obtained instance.

When modifying an existing service, a reference may change from a previous value to a different value, or it may be set to have no value. When deleting a service, the reference may be deleted.

The method 500 of FIG. 5A may be performed as part of the state transition process as shown in FIG. 4. This results in an instance of the service being generated based on the descriptor for the service. The instance comprises a data object that represents a particular configuration of the service. An activated instance has values indicative of the underlying implementing physical, logical and/or virtual devices.

In one case, the method first comprises hierarchically decomposing a descriptor for a requested service to determine one or more child entities required to implement the service. In this case, following decomposition, this process may involve determining, from the descriptor, a type of child entity, and obtaining a descriptor for the determined child entity type. For example, if a service has a service descriptor with a declarative statement indicating that it may have a sub-service of the type "virtual router", a descriptor representative of the "virtual router" type may be retrieved.

Once the above decomposition takes place, any entities that comprise a reference may be identified. This may be performed implicitly as child entities are identified. In this case, resolving the reference may comprise determining a parent-child instantiation path, e.g. to generate the right hand side of FIG. 36. This path may begin with an instance of an entity defined in the reference and determine how to obtain an instance of an entity required to set the parameter value of the reference. This may involve determining a child entity of the specified type, and instantiating the obtained descriptors based on the parent-child instantiation path. Hence, two sets of parent-child hierarchies may be generated: one based on the parent-child relationships of the referrer 360 and one based on the parent-child relationships of the referenced 375.

In certain cases instantiating the obtained descriptors based on the parent-child instantiation path comprises determining whether instances exist for at least of portion of the parent-child instantiation path and using any determined pre-existing instances to instantiate the descriptors. In this case determining a parent-child instantiation path may comprise using a scoring function to determine a descriptor for a child entity that matches the determined child entity type.

Figure 5B:
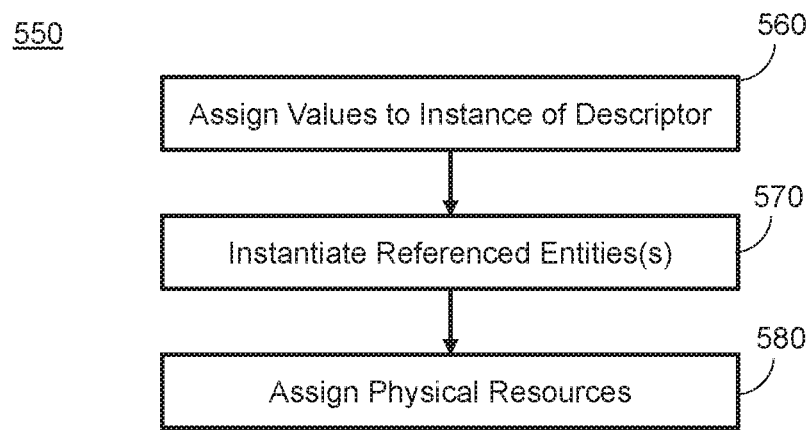
FIG. 5B is a flow diagram showing further steps of a method for provisioning a service according to an example.

FIG. 5B shows a method 550 comprising a number of blocks that may be implemented as part of block 530 in FIG. 5A. Method 550 may be applied repeatedly to each descriptor in the set of descriptors accessed at block 520. At block 560 values are assigned to parameters defined in the descriptor for the service, e.g. values are assigned to an instance of the descriptor. This may comprise assigning values that are indicated in the request and/or assigning a set of pre-existing values, e.g. from another service instance. In one case, the descriptor may indicate how a value may be computed from other values, e.g. by way of functional expressions. These expressions may depend on values in the service instance, but may also draw on external data sources such as, but not limited to, values stored in the data stores 150, 250 and values discovered in the infrastructure 260. At block 570 one or more associated entities for the current service are instantiated. This may involve applying the state transition process of FIG. 4 for each entity. The entities may comprise components, resources and sub-services. At block 580 physical resources are assigned to the generated instances. For example, this may take place as one of the design (560 and 570) or reserve (580) actions in FIG. 4.

Figure 6:
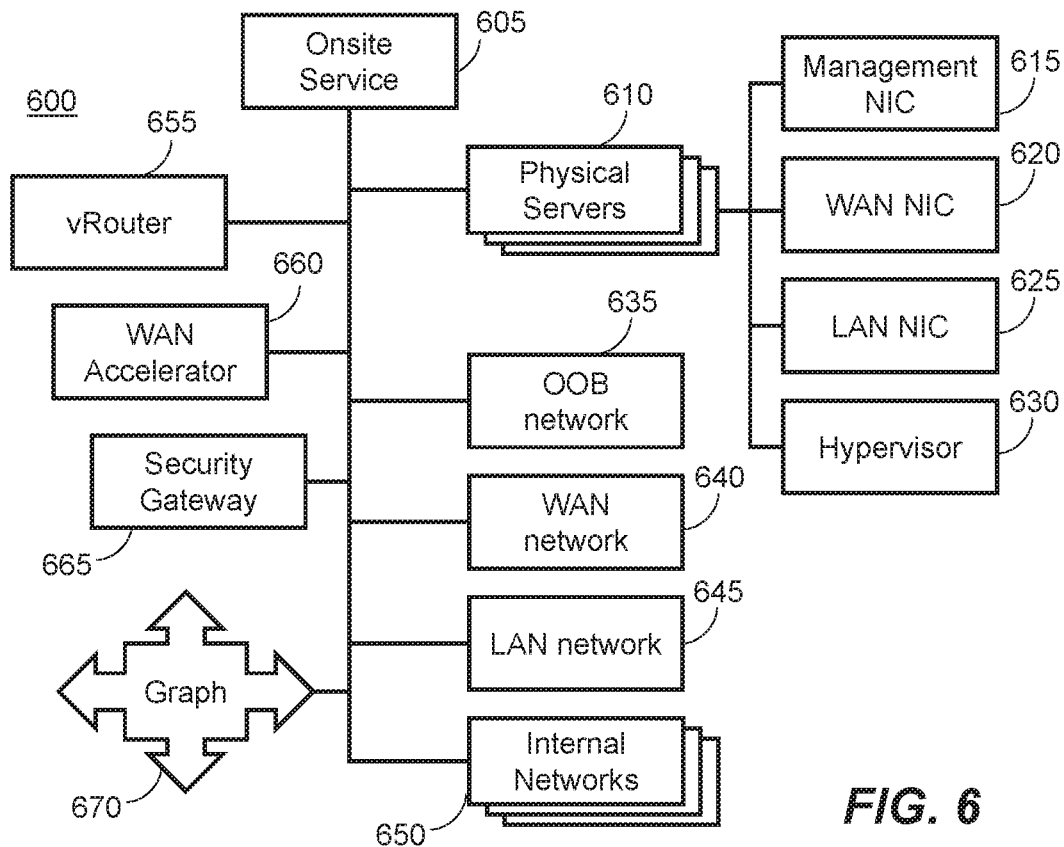
FIG. 6 is a schematic diagram showing a service descriptor for an onsite service according to an example.

To better explain the apparatus and methods described above, an example of provisioning a particular service will now be described. FIG. 6 is a representation 600 of the elements of an onsite service 605. FIG. 6 may indicate the data that forms part of an associated service descriptor data structure for the onsite service 605. The onsite service 605 may comprise a virtual customer premises equipment (vCPE), i.e. an edge device that links a telecommunications provider's wide area network (WAN) to a network domain of a service user.

The onsite service 605 shown in FIG. 6 has a number of associated physical servers 610. These may be defined as child entities in the form of resources 320 in the service descriptor for the onsite service 605. These relate to server computer devices available to implement the service. Each physical server 610 has a number of further child entities. These comprise: a management network interface controller (NIC) 615; a WAN NIC 620; a local area network (LAN) NIC 625; and a hypervisor 630, e.g. a hypervisor running on the physical server. These further child resources may be defined explicitly in the service descriptor for the onsite service 605 or may be defined implicitly by being associated with a descriptor for a physical server. For example, each of 615 to 630 may have a separate descriptor that is set as a child entity in the descriptor for the physical server 610.

The physical servers 610 associated with the onsite service 605 may change: for example they may break or be replaced—in which case a different or modified physical server descriptor may be associated with the service descriptor if the details of the physical server change. In certain cases only an instance of the descriptor may change or be modified, for example if a parameter values needs to change, but the parameter is already defined in the descriptor. For example, as shown the descriptor for a physical server 610 defines the physical NICs of the server. There may be many kinds of server, e.g. from the same or different manufacturers and as such the set of physical NICs may change according to the particular server. This means the definitions for the NICs may vary per physical server descriptor, e.g. in a simple case a parameter may be NIC number. The physical server descriptor may also define which physical NICs are used for which purposes.

The onsite service 605 further has a number of associated networks. In FIG. 6 these comprise an out-of-band (OOB) management network 635, a WAN network 640, a LAN network 645 and a number of internal networks 650. In a simple case these may comprise a set of connected network addresses, such as one or more Internet protocol ranges. When no sub-services are provisioned these network definitions may be seen as parameter place holders, e.g. defining the name of a network. When sub-services are added they make take on a presence via virtual switches on a hypervisor. The sub-services may be defined as entities with associated descriptors that are instantiated. In the examples described below instances of the network definitions 635, 640, 645, 650 may indeed be passed as parameters into entities 610, 655, 660 and 655.

In FIG. 6 the onsite service 605 has three child sub-services: a virtual router (vRouter) sub-service 655; a WAN accelerator sub-service 660 and a security gateway sub-service 665. Each of these sub-services may be defined as a sub-service category, e.g. by a reference to a descriptor for a particular type. During instantiation a particular descriptor representing a particular sub-service of the indicated type may be selected. For example, this selection may be based on the content of a received request and/or a pre-existing service configuration. During instantiation of the onsite service 605 each of the management NIC 610, WAN NIC 620 and LAN NIC 625 may be associated with a physical link, e.g. a physical network interface such as an Ethernet socket, which may then be mapped to a corresponding virtual NIC of an instantiated sub-service. For example, an entity in the form of a virtual network function may comprise a virtual machine entity, with virtual NIC child entities. A virtual NIC may have a "Link" as a child entity, and each link may reference a network port (as shown in the example above) that receives a network entity instance as a passed parameter.

For example, a virtual router type descriptor may define a WAN-facing network parameter and a LAN-facing network parameter. A specific implementation of that virtual router type, e.g. a descriptor for a specific virtual router, then defines which one of its child virtual NICs is WAN-facing and LAN-facing and passes the parameters on to those relevant virtual NICs. The descriptor that defines the virtual NIC may take a network as parameter—if there is no network then the virtual NIC is unconnected. If the network parameter has a value, then the NIC specifies a Link child entity. The Link child then has a reference parameter with the network port as the referenced entity and the network as a parameter. The descriptors associated with the network port entities may have an "auto-create" definition that defines how it may be instantiated to resolve the reference if an instance does not already exist, for example this portion of the definition may define a pattern for an identifier, e.g. a name, of the network port when auto-created. The network port may have multiple auto-create implementations, e.g. one required for physical ports and one required for virtual ports on a given network technology, such as the virtual Switches of the hypervisor. A service controller such as 130 may decide which one to implement based on parameter values of the referrer object, e.g. a link associated with a virtual NIC may require a virtual port.

Hence, instead of trying to explicitly determine the network graph that represents the connections between all the entity instances of a service, examples described herein use the reference and pass the network entity to allow the virtual network function to be set-up as a black-box, e.g. explicit knowledge of the desired connectivity and internal structure of the network function is not required at the level of the on-site service 605. Furthermore, automatic generation of referenced entities may generate the appropriate network port entity instances if they do not exist, so that they can be passed the network entity instances as a parameter. Comparative solutions seek to instantiate each separate entity that is associated with a service and then attempt to determine the connections between the instantiated instances, typically based on hard-coded logic; with a service comprising more than a handful of entities this simply may not be practical or robust.

Lastly, FIG. 6 also has an associated graph definition 670. The graph definition 670 defines how elements may be conditionally passed as parameters to determine a network connectivity of the sub-services, e.g. conditionally based on an instantiated configuration of the onsite service 605. For example, the graph definition 670 may instruct particular elements such as networks 635 to 650 to be passed as parameters to populate values of sub-service instances based on particular conditions of the sub-service instances. For example, if one of the sub-services 655 to 665 is defined then parameter values of a WAN tunnel of a physical box may set by passing the WAN network representation 640. Similarly, if a virtual router sub-service 655 is defined but a WAN accelerator sub-service 660 is not defined then a LAN network of an instance of the virtual router sub-service may be set by passing the LAN network representation 645. In general, the graph definition comprises a collection of policies governing the conditions under which different networks are passed as parameters; it need not be a separately identifiable part of a descriptor in all cases.

FIGS. 7A to 7E show various states of an underlying physical and/or virtual infrastructure 700 as a service is provisioned based on the service descriptor data structure for onsite service 605. The physical and/or virtual infrastructure 700 may comprise at least a portion of physical and/or virtual infrastructure 260 of FIG. 2.

Figure 7A:
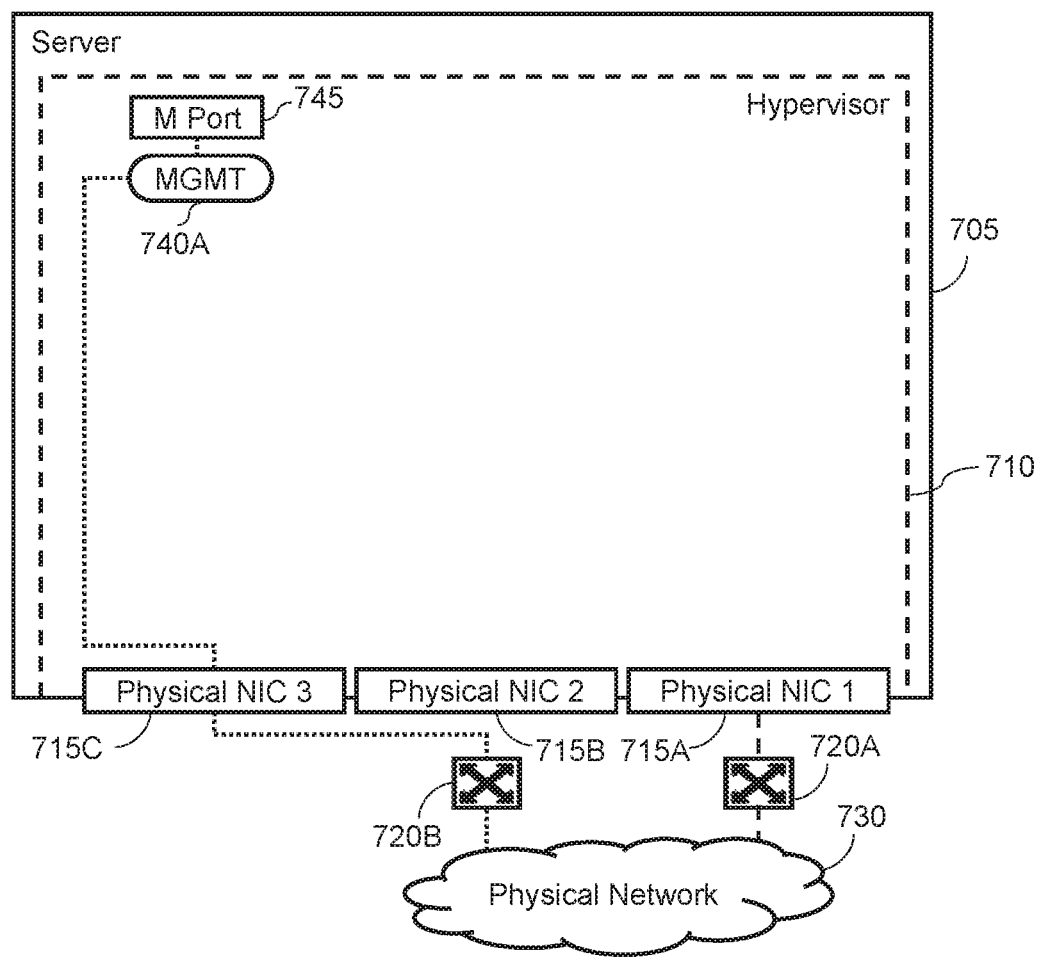
FIGS. 7A to 7E are schematic diagrams showing a number of configurations of a server to provide a respective number of communication services according to an example.

FIG. 7A is one visualization of a physical server 705. Physical server 705 is represented by one of the physical server elements 610. The physical server 705 has three physical NICs: physical NIC 1—715A; physical NIC 2—715B; and physical NIC 3—715C. These physical NICs may be assigned to the NIC representations 615, 620 and 625 as part of service instantiation. In FIG. 7A, physical NIC 1 715A is coupled to network termination 720A and physical NIC 3 is coupled to network termination 720C. Both network terminations 720 are coupled to physical network 730, which may be, amongst others, the Internet or a multiprotocol label switching network.

FIG. 7A also shows a hypervisor 710. This is represented by a hypervisor element 630 in FIG. 6. The configuration of FIG. 7A may represent an instance of the onsite service 605 in which no virtual sub-services are provisioned. The physical NIC 3—715C is mapped to management (MGMT) network 740A. This allows the hypervisor 710 to be remotely managed, e.g. other the Internet, by way of management port 745. As such the instance of the onsite service 605 may have parameter values that associate management NIC 615 with OOB network 635 and physical NIC 3—715C.

Figure 7B:
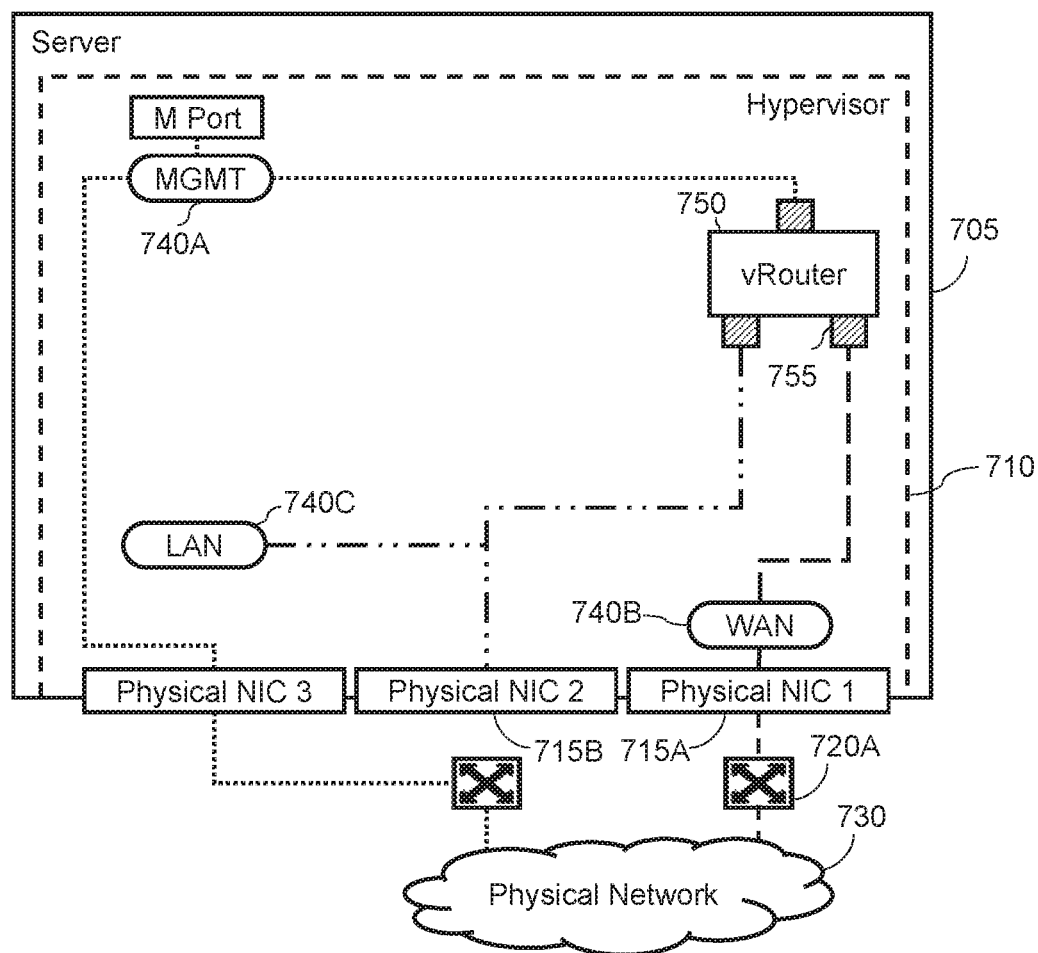

FIG. 7B shows an example of a provisioned virtual router 750. For example, a request may be received to add a virtual router 750 to the service instance representative of FIG. 7A. The virtual router 750 may be added by implementing a router virtual machine image using hypervisor 710. The virtual router has three virtual NICs 755. The virtual router 750 is connected to the management network 740A via one virtual NIC. Another virtual NIC is connected to a WAN 740B, which is further connected to the physical NIC 1—715A and the physical network 730 via the first network termination 720A. The virtual router 750 is also connected to a LAN 740C that is connected to physical NIC 2 715B. Hence, at the site at which server 705 resides, network equipment communicatively coupled to physical NIC 2 715B would be able to communicate on LAN 740C and access external networks via WAN 740B. In the service instance the WAN 740B and LAN 740C are represented as particular values for WAN network 640 and a LAN network 645. The virtual router 750 may comprise sub-elements in the form of virtual NICs and virtual links that are mapped to the physical links of the server 750.

Figure 7C:
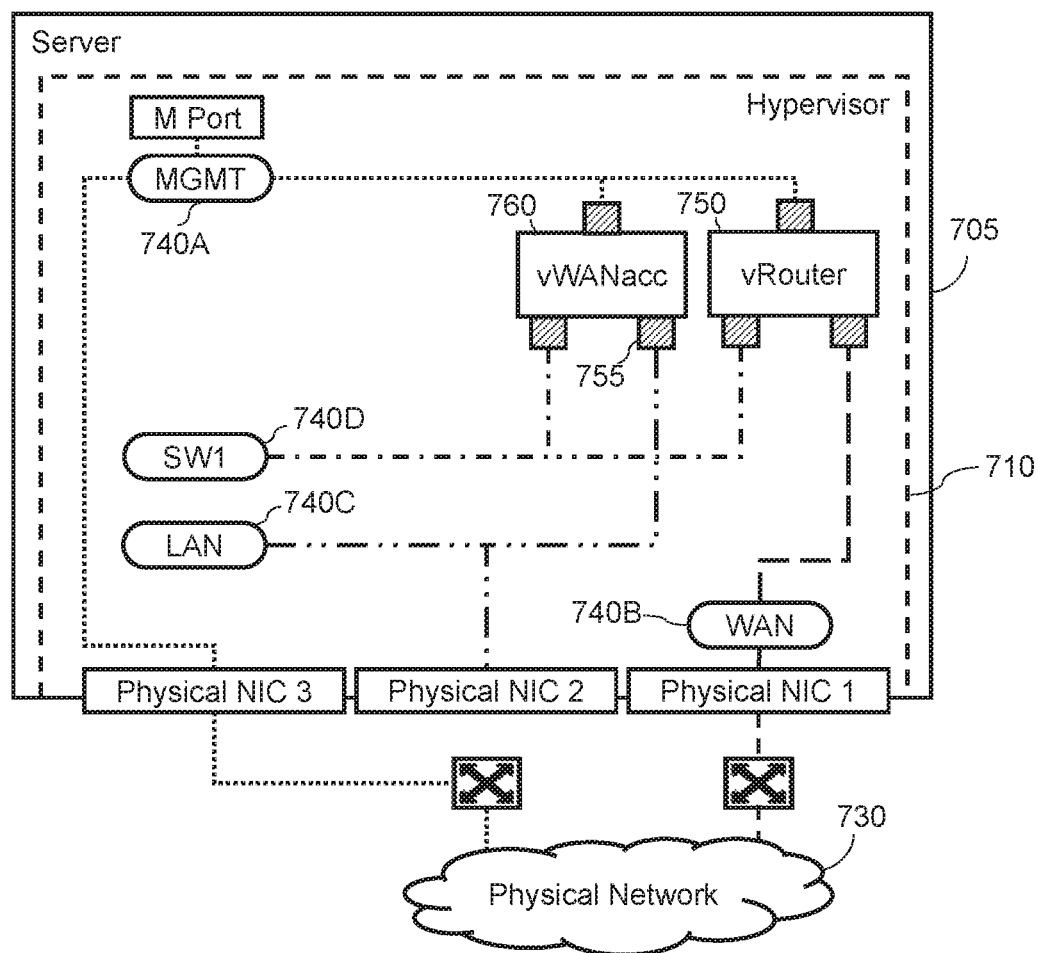

FIG. 7C shows an example of a virtual WAN accelerator 760 that is provisioned in addition to the virtual router 750. For example, a request may be received to add a virtual WAN accelerator 760 to the service instance representative of FIG. 7B. The virtual WAN accelerator 760 may be added by implementing a WAN accelerator virtual machine image using hypervisor 710. The virtual WAN accelerator 760 has three virtual NICs 755. The virtual WAN accelerator 760 is connected to the management network 740A via one virtual NIC. Another virtual NIC is connected to a LAN 740C. The virtual router 750 remains connected to the WAN 740B but is no longer connected to the LAN 740C. Instead, a virtual NIC of the virtual router 750 is connected to a first virtual switch 740D that is also connected to the virtual WAN accelerator 760. This coupling forms an internal network, as represented by element 650. Both the virtual router 750 and the virtual WAN accelerator 760 are connected to the management network 740A.

Figure 7D:
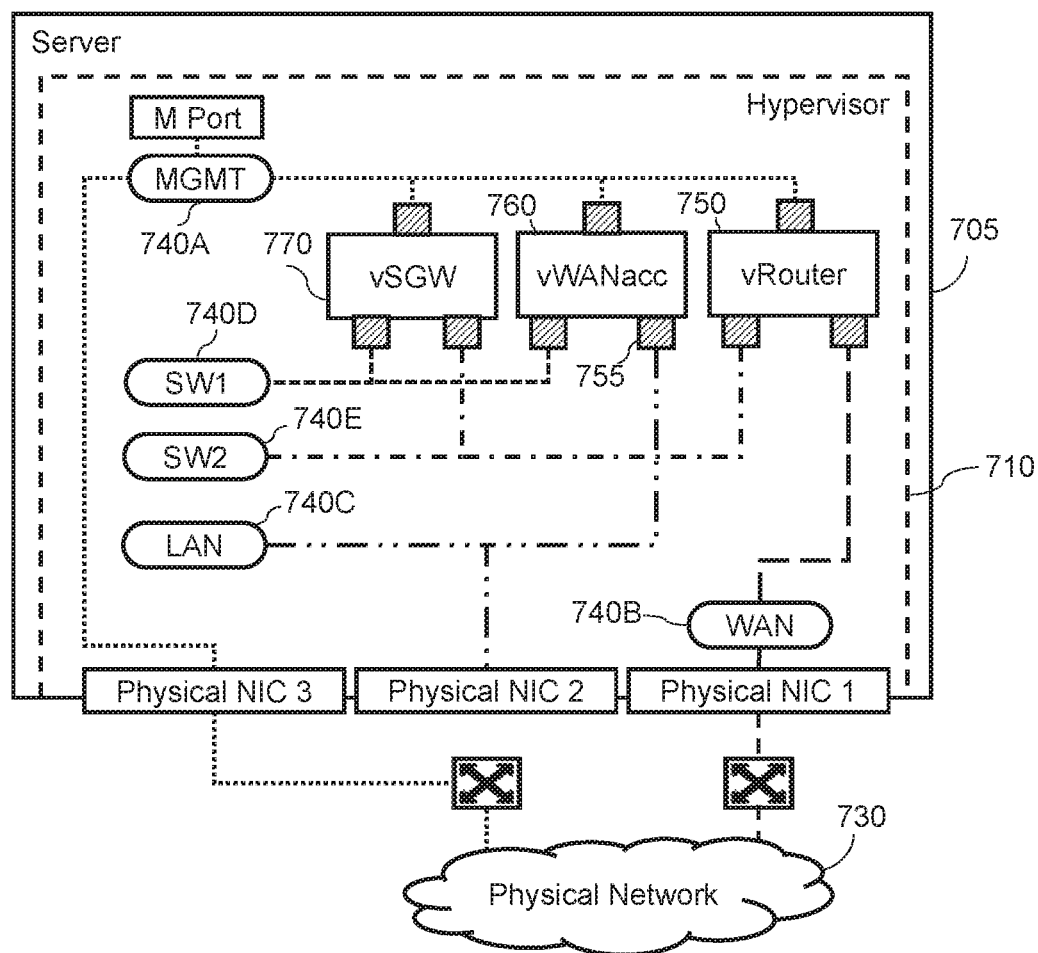

FIG. 7D shows an example of a virtual security gateway 770 that is provisioned in addition to the virtual router 750 and the virtual WAN accelerator 760. For example, a request may be received to add a virtual security gateway 770 to the service instance representative of FIG. 7C. The virtual security gateway 770 may be added by implementing a security gateway virtual machine image using hypervisor 710. The virtual security gateway has three virtual NICs 755. The virtual security gateway 770 is connected to the management network 740A via one virtual NIC. Another NIC is connected to a first virtual switch 740D. A virtual NIC of the virtual WAN accelerator 760 is also connected to the first switch 740D to form a first internal network. The virtual router 750 remains connected to the WAN 740B but is now connected, via a virtual NIC, to a second virtual switch 740E that is also connected to a virtual NIC of the virtual security gateway 770.

Figure 7E:
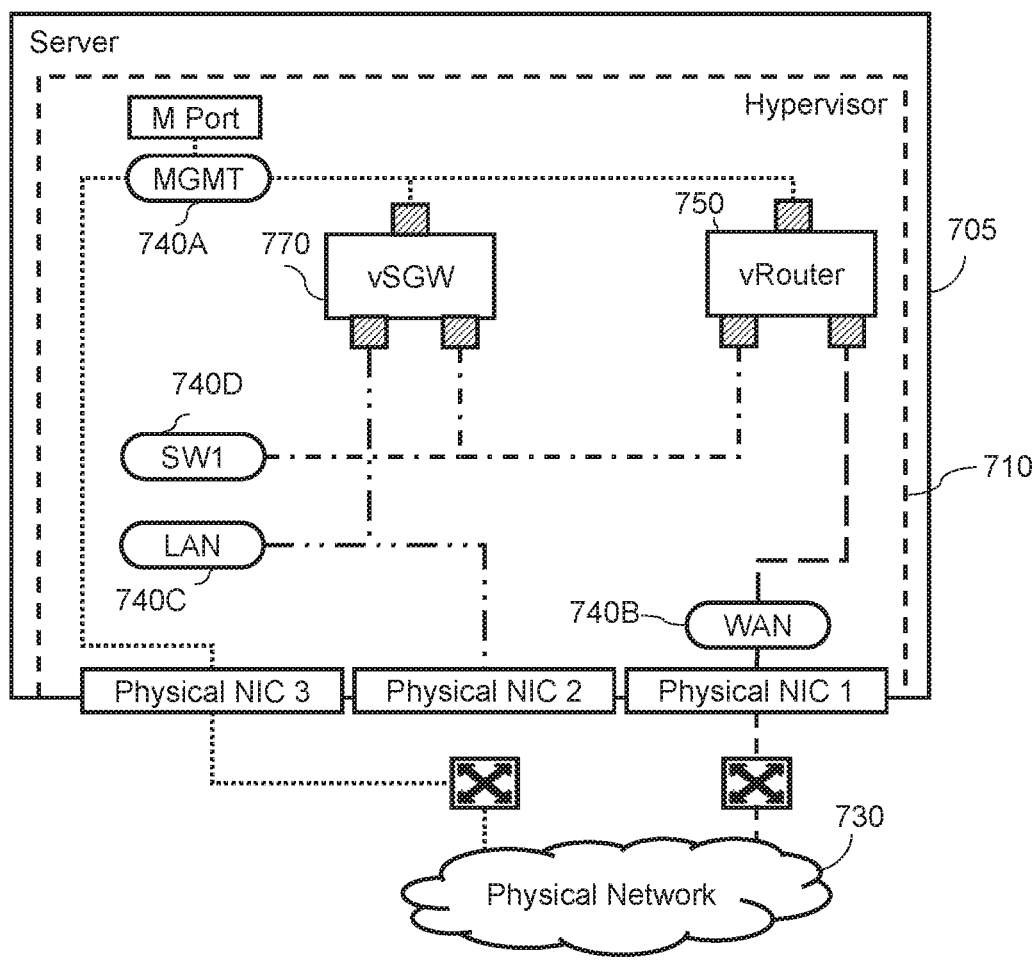

FIG. 7E shows an example of where the virtual WAN accelerator is remove, e.g. in response to a deletion request. Hence Figure shows the virtual router 750 and the virtual security gateway 770. To accommodate this change the second virtual switch 740E is deleted and a first virtual switch 740D is generated that connects the virtual router 750 and the virtual security gateway 770. Also the configuration of the LAN 740C is modified such that it is connected to a virtual NIC of the virtual security gateway 770 rather than the virtual NIC of the virtual WAN accelerator 760.

The provisioning of services shown in FIGS. 7A to 7E may be performed in any order. There are no explicitly defined service transitions, for example each of the virtual router 750, virtual WAN accelerator 760 and virtual security gateway 770 may be added and removed as services in any order. The graph definition 670 of FIG. 6 specifies how virtual links on the virtual NICs are coupled to ports on the virtual switches and how these ports are coupled to physical links on physical interfaces. In these examples, entities 740 are created and destroyed as different sub-services are added and removed—this is performed automatically using the examples described herein. For example, the virtual switches may be "Use-Counted" entities—instances of these entities may be required to implement an internal network but if no internal network is instantiated, e.g. as in FIG. 7B no virtual switches need to be created. Moreover, the connectivity of the NICs, both physical 715 and virtual 755, is determined automatically based on the referencing and passing of network entity instances as parameters. As such changing from each of the configurations shown in FIGS. 7A to 7E may be performed in real time (e.g. over a period of minutes or hours) on a server computer device and users onsite that couple computer devices to physical NIC 2 715E of the physical server 715 would see different network functionality based on each configuration, e.g. may see WAN acceleration in the configurations of FIGS. 7B and 7C and may see additional network security in the configuration of FIG. 7C.

FIGS. 7A and 7E are one visualization of a virtual configuration. In other cases, the child or sub-services 750, 760 and 770 need not be in a common hypervisor. For example, a hypervisor may be thought of as one "black box" and a virtual router may be thought of as another "black box". In this case, the definitions of the NICs and network ports are internal to the "black boxes", e.g. different implementations may have different numbers of internal components. The "black boxes" may be passed parameters in the form of network definitions that then cause the internal components to be created and configured. This has advantages if the virtual router of FIGS. 7B to 7E needs to be implemented in a data center remote from server 705. When using the described examples this may simply involve not passing a WAN network configuration; whereas in a comparative case where the connections are explicitly defined, a previous network connection specification would no longer be valid and would need to be re-defined, e.g. re-coded.

Configuring links in practice may be performed programmatically by connecting the hypervisor's representation of a physical NICs to virtual Switches represented as virtual entities in the hypervisor software. This uses configuration features supported by the hypervisor, which in turn leverages the operating system under whose control the hypervisor software executes. The operating system has drivers for the physical devices of the computer, which allows configuration of those devices to be performed programmatically.

In one case provisioning a service comprises modifying a pre-existing service including determining, from a descriptor associated with the service, whether a parameter to be modified is mutable, responsive to the parameter being mutable, modifying a value of the parameter on an instance associated with the pre-existing service while said service is active and, responsive to the parameter not being mutable, re-instantiating one or more of an instance of the service and an instance of an associated entity with the value of the parameter. In certain cases a shadow version of a service instance may be maintained in parallel with any active version. This shadow version may then be used for comparing, at the one of the transitions of FIG. 4, the versions to determine if any parameters were modified. In other cases mutable parameters may be isolated into a child entity, so that the parent service may stay unchanged, while the modification of mutable parameters is done by creating, deleting or recreating the child service.

Certain examples described herein thus address the complex interconnectivity of service components. Instead of managing complex graphs, service designers can concentrate on defining, using parameter passing and references, the structure and constraints of the services to be managed. Using this structure and the defined constraints, provided in the form of a descriptor, certain examples described herein may automatically compute the low-level actions needed on the underlying infrastructure. Using descriptors as described herein allows systematic testing of service creation, modification and deletion; this in turns helps avoid coding errors that may easily occur in hand-coded transition processes. Furthermore, the time to design or on-board a service is reduced by orders of magnitude compared to comparative solutions, e.g. from months to days or hours.

By using the described examples, network interfaces (NICs) of a virtual and/or physical network function may be easily attached to a network, and the system or systems on which the network should be created, e.g. as a virtual switch, may be automatically inferred. How a NIC should be configured on any determined virtual switch may also be inferred, as this may depend on the type of NIC, e.g. whether it is physical or virtual. In comparative systems connectivity may instead be modelled as an explicit graph of NICs and networks. In practice these graphs are very difficult to define and comprehend. For example, virtual network functions may consist of a varying number of virtual machines with many NICs each and so the number of virtual machines employed by the virtual network function directly impacts the complexity of the definition of the graph. Certain examples described herein address this by using the mechanisms of passing an abstract network definition as a parameter. The referencing described herein may also further be used to automatically infer how to fetch a versioned virtual machine image from a remote inventory onto a given hypervisor when that image is referenced by a service that requires the image for its virtual machine.

Certain examples described herein may be applied to provision a new virtual network function as part of a network function virtualization. They provide a method of processing a provisioning request from the moment the request is triggered and received to the moment where all the components of the virtual network function are deployed and properly configured. Certain examples described herein address the fact that a virtual network function may contain several components, for example some being virtual, some being non-virtual and some even being other virtual network functions; wherein each component may need a different configuration of resources, such as (amongst others) disk use, processor use, memory, bandwidth, and the components may need to be connected to one another.

The service engine described herein may include a microprocessor, microcontroller, dedicated circuitry, processor module or subsystem, programmable integrated circuit, programmable gate array, or another control or computing device. It may be implemented by way of computer program code retrieved from a computer-readable storage medium The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. In the examples described herein the term "communicatively coupled" extends to any coupling whereby one component or module makes a function call on another component or module, including cases where both modules are executed within a common execution framework.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A method for provisioning a first service, comprising:
   accessing a service descriptor data structure for the first service;
   identifying, using the service descriptor data structure, one or more references to implement the first service, wherein the one or more references link a referring service to the first service with a definition to implement the first service in accordance with a passed value of a parameter defined by the referring service, and wherein the one or more references indicating a type of service to be implemented as the first service;
   instantiating the service descriptor data structure for the first service to obtain a first instance associated with the type of service indicated by the one or more references, wherein the first instance is to be passed to a function for obtaining a second instance of the type of service indicated by the one or more references; and
   performing the function, the function determining how to map from the passed first instance to the second instance of the type of service indicated by the one or more references,
   wherein the second instance of the type of service corresponds with the passed value of the parameter defined by the referring service and an inherited parameter value from a parent instance of the type of service indicated by the one or more references.

2. The method of claim 1, further comprising:
   determining a parent-child instantiation path to map from the first instance to a third instance of the type of service; and
   instantiating a second service descriptor data structure based on the parent-child instantiation path.

3. The method of claim 2, wherein instantiating the second service descriptor data structure based on the parent-child instantiation path comprises:
   using the third instance to instantiate the second service descriptor data structure.

4. The method of claim 2, wherein determining the parent-child instantiation path comprises:
   using a scoring function to determine a third service descriptor data structure for a child service that matches a determined child type of service.

5. The method of claim 1, wherein the service uses network function virtualization, and wherein instantiating the service descriptor data structure to generate the second instance of the service comprises:
   assigning physical resources to implement at least one generated instance, said physical resources comprising one or more of computing, storage and networking resources.

6. The method of claim 1, wherein obtaining an instance of the type of service indicated by the one or more references comprises:
   determining if an instance of the type of service indicated by the one or more references exists;
   responsive to an instance of the type of service indicated by the one or more references existing, using the existing instance to instantiate the descriptor for the service; and
   responsive to an instance of the type of service indicated by the one or more references not existing, generating an instance of the type of service indicated by the one or more references and using the generated instance to instantiate the descriptor for the service.

7. The method of claim 6, wherein generating an instance of the type of entity indicated by the one or more references comprises:
   determining if the proposed instance has a parent service that is not yet instantiated; and
   responsive to a positive determination, instantiating the parent service before generating the instance.

8. The method of claim 1, wherein provisioning the first service comprises modifying a pre-existing service and the method comprising:
   determining, from the service descriptor data structure associated with the first service, whether the parameter to be modified is mutable;
   responsive to the passed value of the parameter being mutable, modifying the passed value of the parameter on an instance associated with the pre-existing service while said service is active; and
   responsive to the parameter not being mutable, re-instantiating one or more of an instance of the service and an instance of an associated service with the passed value of the parameter.

9. The method of claim 1, wherein the indication of an instance includes an assigned value.

10. The method of claim 1, wherein the indication of an instance includes a set of pre-existing values.

11. The method of claim 1, wherein the type of service is a network port and the function generates intermediate instances for the network port.

12. The method of claim 1, wherein the parent instance corresponds with a virtual network function, and the second instance is a sub-service implementation of the virtual network function.

13. The method of claim 1, wherein the second instance corresponds to a real, resource-consuming configuration of an actual physical and/or virtual infrastructure.

14. The method of claim 1, wherein the first service and the second service each correspond with one of a set of states, wherein the set of states correspond with non-existent, checked, designed, reserved, provisioned, instantiated, active, inactive, and terminated.

15. An apparatus for configuring a first service comprising:
- an interface configured to receive a command to provision the first service;
- a service controller communicatively coupled to the interface, a descriptor data store and an instance data store, the service controller including a processor and a memory, the memory comprising instructions executable by the processor to:
  - parse the command and obtain a service descriptor data structure for the first service from the descriptor data store,
  - decompose the first service based on the descriptor to determine one or more references required to implement the first service, wherein the one or more references link a referring service to the first service, and
  - obtain an instance of the first service to provision, the first service based on the obtained descriptor and to manage the instance in the instance data store, and
- the service controller being further configured to, for a given reference:
  - use a first instance of an entity indicated in the given reference to obtain a second instance of a type of entity indicated in the given reference, the second instance being used as a passed value of a parameter for a third instance of the entity indicated in the given reference, wherein the third instance corresponds with the passed value of the parameter defined by the referring service and an inherited parameter value from a parent instance of the type of service indicated by the one or more references.

16. The apparatus of claim 15 further comprising:
- an interface configured to instruct an assignment of physical resources to at least one instance to activate the first service, said physical resources comprising one or more of computing, storage, and networking resources.

17. The apparatus of claim 16, wherein the service controller is further configured to:
- retrieve a value associated with the command and a fourth instance in the instance data store, and
- assign the passed value of the parameter to one or more parameters associated with the service descriptor data structure of the service to instantiate the service.

18. A non-transitory computer-readable storage medium comprising a set of computer-readable instructions stored thereon, which, when executed by a processing system, cause the processing system to:
- obtain a parent service descriptor data structure;
- determine types for a set of child entities indicated in the parent service descriptor data structure;
- obtain type descriptor data structures for the determined types;
- obtain child service descriptor data structures to implement the determined types;
- determine a set of references from one or more of the parent descriptor data structure and the determined child descriptor data structures, each reference indicating at least a type of service to be implemented as a first instance and the first instance to be passed as a parameter; and
- instantiate the obtained descriptor data structures to obtain a set of instances, this instruction causing the processor system to:
  - obtain the first instance to be passed as the parameter and pass the first instance to a function to obtain a second instance associated with the type of service to be implemented as the first service indicated in the reference,
- wherein the second instance of the type of service corresponds with a passed value of the parameter defined by a referring service and an inherited parameter value from a parent instance of the type of service indicated by the set of references.

19. The non-transitory computer-readable storage medium of claim 18, comprising an instruction to cause the processing system to:
- determine whether an instance associated with the type indicated in the reference exists, and
- generate the instance in the case that the instance does not exist.

20. The non-transitory computer-readable storage medium of claim 19, wherein the instructions cause the processing system to determine whether an instance exists by searching an instance data store for an instance identifier that matches a pattern indicated in the type descriptor data structure.

* * * * *